(12) United States Patent
Diggle, III et al.

(10) Patent No.: US 7,016,585 B2
(45) Date of Patent: Mar. 21, 2006

(54) COMPRESSIBLE LAYER FOR FIBER OPTIC CABLE

(75) Inventors: Frederick Diggle, III, Birmingham, AL (US); Steven Ryals, Pinson, AL (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 44 days.

(21) Appl. No.: 10/838,661

(22) Filed: May 4, 2004

(65) Prior Publication Data

US 2005/0249472 A1  Nov. 10, 2005

(51) Int. Cl.
G02B 6/22 (2006.01)
(52) U.S. Cl. ............... 385/128; 385/123; 385/125; 385/126
(58) Field of Classification Search ........ 385/125–127, 385/128
See application file for complete search history.

(56) References Cited

U.S. PATENT DOCUMENTS

| | | | | |
|---|---|---|---|---|
| 4,705,353 A | * | 11/1987 | Wagoner | 385/101 |
| 2004/0240808 A1 | * | 12/2004 | Rhoney et al. | 385/100 |
| 2004/0252954 A1 | * | 12/2004 | Ginocchio et al. | 385/100 |
| 2005/0013573 A1 | * | 1/2005 | Lochkovic et al. | 385/128 |

* cited by examiner

*Primary Examiner*—John D. Lee
*Assistant Examiner*—James D. Stein
(74) *Attorney, Agent, or Firm*—Merchant & Gould

(57) ABSTRACT

A layered fiber optic cable having a compressible layer for protecting the fiber optic core from damaging displacement due to force from the freezing of trapped ambient water. As ambient water within a protective conduit freezes, the water expands, applying a force on the fiber optic cable within the conduit. The compressible layer absorbs the expansion of the freezing water by compressing, therefore minimizing displacement of the fiber optic core and resulting signal degradation.

20 Claims, 3 Drawing Sheets

COMPRESSIBLE LAYER FOR FIBER OPTIC CABLE

TECHNICAL FIELD

The present invention relates to the protection of fiber optic cable within buried conduit. More particularly, the present invention relates to protecting the fiber-optic core within a fiber optic cable from damage caused by the force placed on the cable from the freezing and consequent expansion of ambient water within the conduit.

BACKGROUND OF THE INVENTION

Fiber optic cables provide numerous advantages over traditional communication cables, particularly higher transmission speeds and improved transmission quality. However, fiber optic cable is susceptible to a unique problem associated with water accumulation around the cable. Installation of fiber optic cable typically involves burying conduit between two end locations. The fiber optic cable is then installed within the protective conduit. Water sometimes enters the conduit either through access points in the conduit or through condensation within the conduit. Either way, the water flows downhill and accumulates within the conduit. The conduit is usually buried below the frost line so that freezing does not occur. However, where the conduit is above the frost line and exposed to freezing temperatures, the water that has accumulated within the conduit freezes, creating significant pressure on the fiber optic cable within the conduit. This pressure can cause the fiber optic strands within the cable to bend, damaging the fragile glass strands that make up the fiber optic core and leading to signal degradation. Additionally, the force from the freezing ambient water can cause the glass strands that make up the fiber optic core to break, requiring costly repair. The problem is amplified when water penetrates the cable itself and freezes or when the glass fibers freeze.

Various solutions to these problems have been attempted. One solution is to fill the conduit with anti-freeze materials in an attempt to prevent water trapped inside from freezing. Another solution is to fill the conduit around access points with a material that expands within the conduit to create a barrier to water entry, forming a chemical plug. An additional solution is to drill weep holes in the conduit in an attempt to create drainage for trapped water. Invariably, due to elevation differences along the length of the conduit, plugged weep holes, or improperly trained personnel, these solutions have met with a limited amount of success. Additionally, chemical plugs can inhibit access to the cable and make cable removal and repair difficult.

While these methods attempt to prevent water from entering the protective conduit, it is desirable to prevent the displacement of the fiber optic core of the cable in the event that water does enter the conduit and freeze, applying a force directly to the cable. One available solution is to apply a jacket to the fiber optic cable that is made from a very robust material such as steel. In doing so, the force required to bend the steel jacket and displace the core would be greater than that created by the force of freezing water. However, this solution is expensive, hard to work with, and not designed for aqueous environments. Another solution for keeping water out of the fiber optic cable itself is to maintain positive air pressure within the cable. However, this solution does not prevent signal degradation due to forces from freezing water surrounding the cable within the protective conduit. For these reasons, a new method for minimizing signal degradation of fiber optic cable due to bending caused by the expansion of freezing ambient water is desirable. It is with respect to these considerations and others that the present invention has been made.

SUMMARY OF THE INVENTION

Aspects of the present invention address these problems and others by providing a layered fiber optic cable with at least one compressible layer that can absorb the pressure applied to the cable by ambient water trapped in the conduit as it freezes. Rather than attempt to solve the problem strictly by focusing on preventing water from entering the conduit with the fiber optic cable, the present invention provides a solution that is based on a fiber optic cable that prevents signal degradation when a force is applied to it. By approaching the problem in this manner, even if water enters a conduit and is exposed to freezing conditions, the integrity of the fiber optic cable is maintained. The present invention may even be used in conjunction with the present solutions described above to provide complete confidence in cable reliability during winter months.

According to one aspect of the present invention, at least one strand of optical fiber forms the axial core of a fiber optic cable. The cable further comprises at least one layer of strengthening material surrounding the core. This material may be aramid yarn to provide tensile strength to the cable. Additionally, the cable has a jacket that encompasses the core and the strengthening layer. The fiber optic cable also has a compressible layer that encompasses the core of the cable. This layer compresses whenever ambient water freezes and applies a force to the cable. By compressing, this layer prevents or minimizes the movement of the fiber optic core of the cable, preventing signal degradation. This compressible layer may be manufactured from elastic materials such as neoprene or closed cell foam. Another aspect of the invention adds a fiber coating layer and a plastic overcoat layer around the cable core.

According to yet another aspect of the present invention, a method is provided for forming a layered fiber optic cable. The method provides at least one strand of optical fiber for forming the axial core of the cable. At least one layer of strengthening material is provided around the axial core. The strengthening layer is comprised of aramid yarn. A compressible layer is provided around the core to absorb the force applied to the core by the freezing action of ambient water. Neoprene or closed cell foam is used to form the compressible layer. These types of materials additionally provide the interior of the cable with insulation that operates to prevent freezing within the cable. A jacket is provided around the layers of the fiber optic cable.

These and various other features as well as advantages, which characterize the present invention, will be apparent from a reading of the following detailed description and a review of the associated drawings.

DETAILED DESCRIPTION

Figure 1:
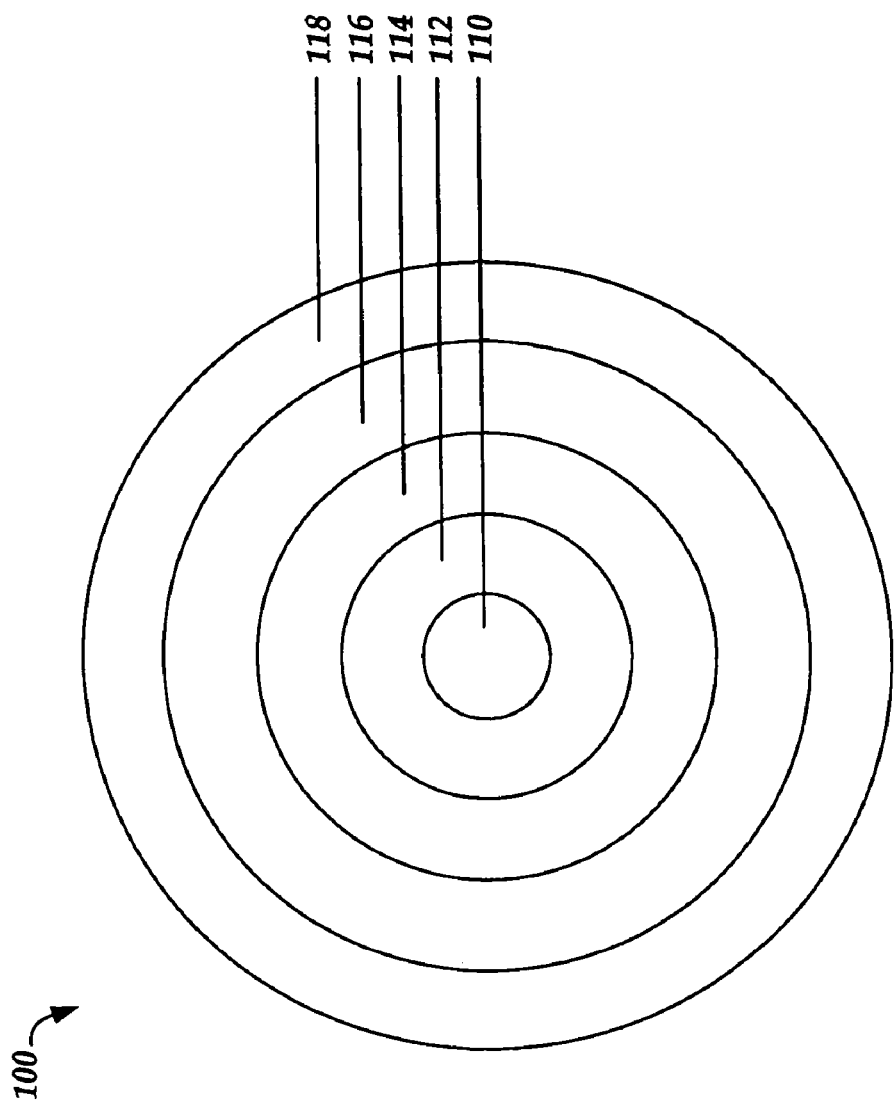
FIG. 1 depicts a cross-sectional view of a typical fiber optic cable as known in the art.

Signal degradation due to ice-induced bending of the fiber optic strands of a fiber optic cable may be minimized through embodiments of the present invention. FIG. 1 shows the various layers of a typical fiber optic cable 100 as known in the art. The core 110 of the cable is made up of at least one strand of transparent dielectric material, usually glass filament. A layer of fiber coating 112 surrounds the core 110. The fiber coating 112 is made from one or more layers of material of lower refractive index than that of the core. An overcoat 114 surrounds the fiber coating 112. The overcoat 114 is made from plastic or other polymer material. The overcoat 114 may include a high heat resistant thermoplastic resin (not shown). The layer that surrounds the overcoat 114 is the strength member 116. The strength member 116 is a strengthening layer that is included to protect the fiber optic core from excessive tensile and bending stresses. This layer is typically formed from aramid yarn, but may be made of any material sufficient to increase the tensile strength of the fiber optic cable 100. Finally, the layered cable is surrounded with a jacket 118 to further contain and protect the other layers within.

The fiber coating 112, overcoat 114, strength member 116, and jacket 118, as well as any resins used in manufacturing the cable, are substantially incompressible. In this context, substantially incompressible means that these layers do not have properties that allow the layer to compress, decreasing the thickness of the layer a substantially equivalent amount to the linear displacement of the ambient water toward the fiber optic cable as the water molecules crystallize and expand during freezing. While virtually all material is compressible given enough applied force, the layers described above will not compress under the force of expanding freezing water to the extent that the layers can absorb the displacement of the expanding freezing water and allow the optical fibers in the core of the cable to remain undisturbed.

Figure 2:
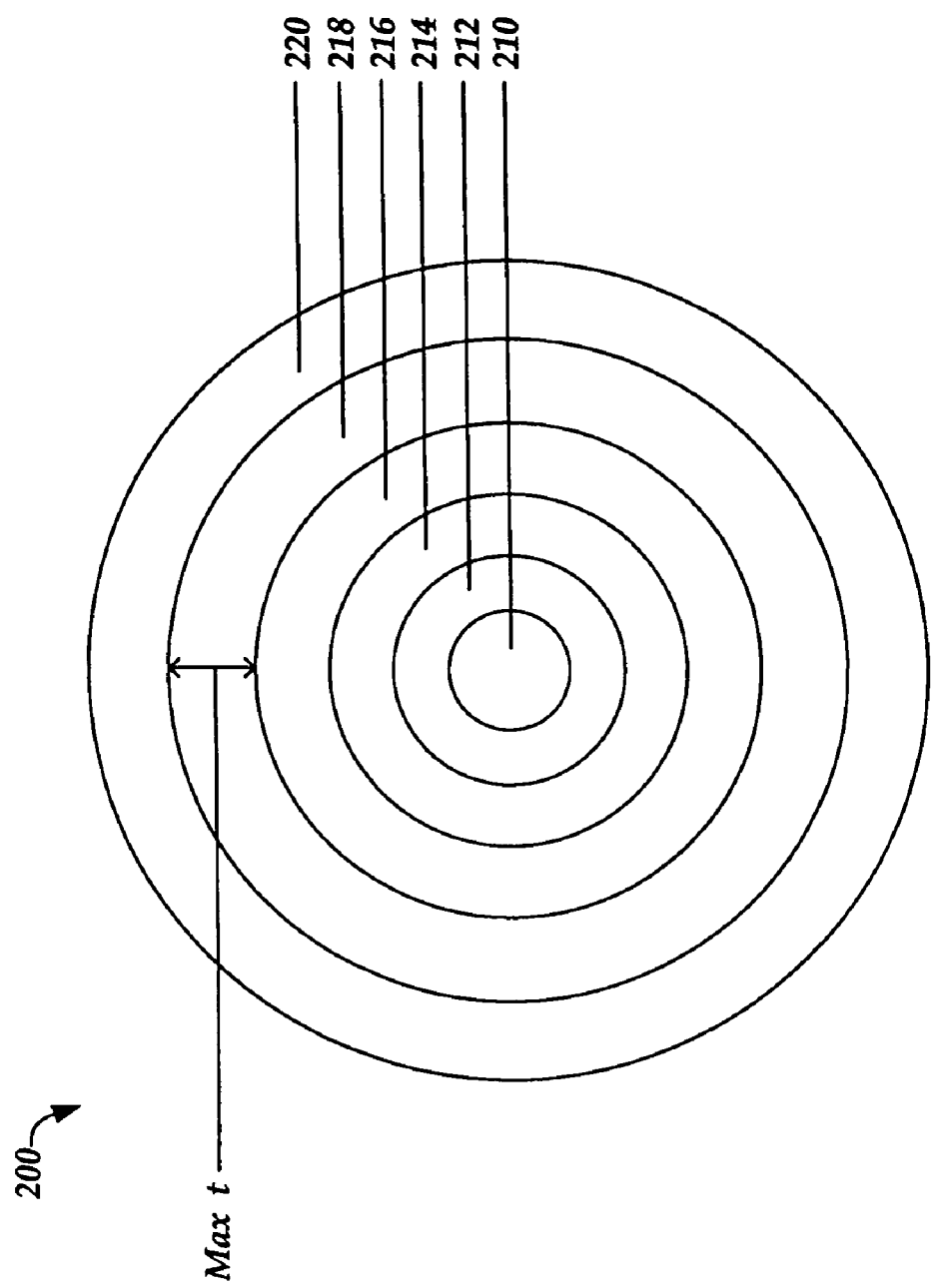
FIG. 2 depicts a cross-sectional view of a fiber optic cable according to one embodiment of the present invention.

FIG. 2 depicts the layers of a fiber optic cable 200 according to one embodiment of the present invention. The cable 200 has at least one strand of optical fiber that forms the axial core 210. The core 210 is surrounded by a fiber coating 212 consisting of one or more layers of material of lower refractive index than that of the core. An overcoat 214 encompasses the fiber coating 212. The overcoat 214 may be made from plastic or other polymer material. The overcoat 214 may include a high heat resistant thermoplastic resin (not shown). Just as the typical fiber optic cable 100 described above includes strength member 116 to increase the cables tensile strength, fiber optic cable 200 of the present invention includes strength member 216 to protect the fiber optic core 210 from excessive tensile and bending stresses. Again, this layer is typically formed from aramid yarn, but may be made of any material sufficient to increase the tensile strength of the fiber optic cable 200. Additionally, there may be more than one strength member within fiber optic cable 200. Cable 200 is also surrounded with a jacket 218 to further contain and protect the other layers within.

Figure 3:
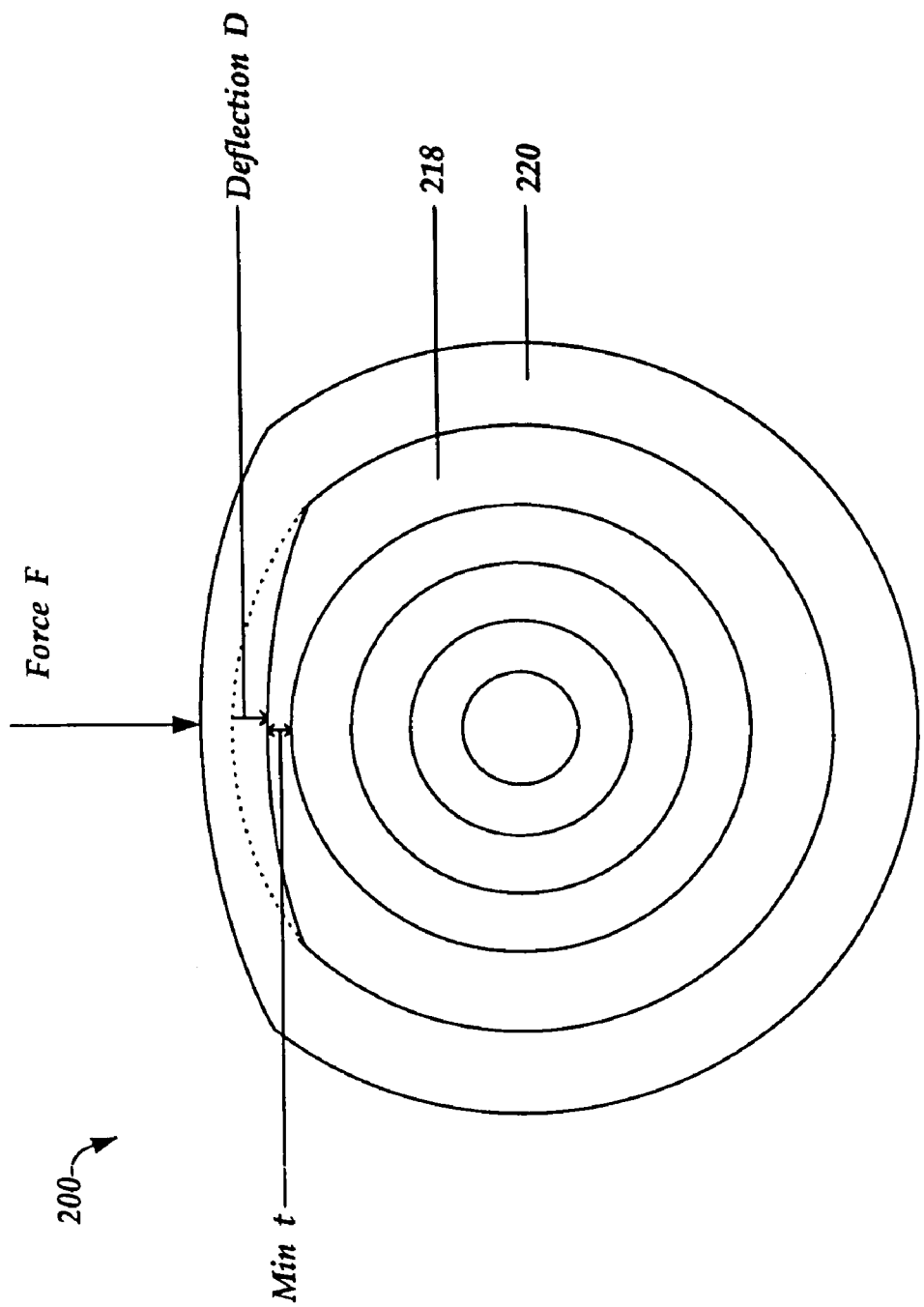
FIG. 3 depicts a cross-sectional view of the fiber optic cable of FIG. 2 under an application of force.

In addition to these layers, fiber optic cable 200 includes a compressible layer 218. Compressible layer 218 has a maximum thickness ("max t" in FIG. 2). "Max t" is the thickness dimension of the compressible layer in its relaxed state, without an external force being applied to the cable. FIG. 3 shows fiber optic cable 200 from FIG. 2 undergoing a force F from the expansion of freezing ambient water. Compressible layer 218 is absorbing the force F by compressing down to a minimum thickness ("min t"). "Min t" is dependent on the compressible characteristics of the material used in compressible layer 218. One skilled in the art will appreciate that while FIG. 3 depicts force F being applied to a single location on cable 200, depending on the position of the cable within the interior of the protective conduit and with respect to the surrounding water and the uniformity with which the water freezes, force F may be applied to more than one location around the circumference of cable 200, or even simultaneously around the entire circumference of the cable. "Max t" minus the "min t" of the compressible layer 218 results in the maximum amount of deflection D that the compressible layer may compress to absorb force F at any one location around the circumference of fiber optic cable 200.

Not only does compressible layer 218 compress to absorb force F, but "max t" also serves to increase the diameter of cable 200. Increasing the diameter of cable 200 decreases the amount of water that can accumulate between the cable and the walls of the conduit. The less water that is allowed to freeze, the smaller the displacement of the volume of water as it expands, corresponding to a smaller force applied to the cable that occupies the same space within the conduit.

It is to be understood that compressible layer 218 may be constructed from any material with a "max t" that is sufficiently large to provide the desired deflection capabilities of the cable 200 given the compressible characteristics of the material used for the compressible layer. Additionally, compressible layer 218 may be formed from a material that has elastic properties. Elasticity allows the compressible layer 218 to return to "max t" after the ambient water within the protective conduit has thawed. This preserves the protective qualities of the compressible layer 218 since it is likely that a fiber optic cable 200 will be susceptible to repeated applications of force from freezing water in the same locations. Examples of suitable compressible-layer material are neoprene and closed cell foam. To ensure continued signal quality, jacket 220 may be made from deformable material to allow compressible layer 218 to return to "max t" following compression. Examples of suitable jacket materials include polyethylene, polyurethane, polymeric enamel, and other elastomers. Jacket 220 may also be formed from non-deformable materials such as steel or polyvinyl chloride. When non-deformable materials are used, compressible layer 218 still operates to protect the fiber optic core 210 in the case that jacket 220 is breached or bends.

It is to be further understood that the layers described above with respect to fiber optic cable 200 and shown in FIG. 2 may be located within the fiber optic cable 200 in various sequences. For example, the compressible layer 218 may be manufactured into the cable between strength member 216 and jacket 220, between fiber optic core 210 and the strength member, or even outside of the jacket. Moreover, the fiber optic cable 200 may not include all of the layers described above and shown in FIG. 2, or may include additional layers than those described above.

Although the present invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A layered fiber optic cable for being placed in a conduit, the fiber optic cable comprising:
   at least one strand of optical fiber forming an axial core of the fiber optic cable;

at least one layer of strengthening material surrounding the at least one strand of optical fiber;

a jacket encompassing the at least one strand of optical fiber and the at least one layer of strengthening material; and at least one compressible layer of material encompassing the at least one strand of optical fiber, wherein the compressible layer of material is configured to compress the at least one strand of optical fiber in response to an application of force due to freezing of water surrounding the fiber optic cable, such that, for a maximum amount of freezing water capable of forming between the conduit and the layered fiber optic cable, the thickness and the compressible characteristics of the compressible layer of material being selected to cause the compressible layer of material to minimize displacement of the at least one strand of optical fiber in response to the application of force.

2. The layered fiber optic cable of claim 1 wherein the strengthening material is aramid yarn.

3. The layered fiber optic cable of claim 1 wherein the compressible layer of material comprises neoprene.

4. The layered fiber optic cable of claim 1 wherein the compressible layer of material comprises closed cell foam.

5. The layered fiber optic cable of claim 2 further comprising:
a fiber coating layer surrounding the at least one strand of optical; and
a plastic overcoat layer surrounding the at least one strand of optical fiber.

6. The layered fiber optic cable of claim 1, wherein the at least one compressible layer of material is disposed between the at least one layer of strengthening material and the jacket.

7. The layered fiber optic cable of claim 1, wherein the at least one compressible layer of material is disposed between the at least one layer of strengthening material and the optical fiber core.

8. The layered fiber optic cable of claim 1, wherein the at least one compressible layer of material has elastic characteristics so that the compressible layer of material returns substantially to its original shape upon removal of the force.

9. A method for forming a layered fiber optic cable configured to be placed in a conduit, the method comprising:
providing at least one strand of optical fiber such that the at least one strand forms an axial core of the cable;
providing at least one layer of strengthening material around the at least one strand of optical fiber;
providing at least one compressible layer of material around the at least one strand of optical fiber, wherein the compressible layer of material is configured to compresses the at least one strand of optical fiber in response to an application of force due to freezing of water surrounding the fiber optic cable, such that, for a maximum amount of freezing water capable of forming between the conduit and the layered fiber optic cable, the thickness and the compressible characteristics of the compressible layer of material being selected to cause the compressible layer of material to minimize displacement of the at least one strand of optical fiber in response to the application of force; and providing a jacket around all of the layers of the fiber optic cable.

10. The method of claim 9 wherein the strengthening material is aramid yarn.

11. The method of claim 9 wherein the compressible layer of material comprises neoprene.

12. The method of claim 9 wherein the compressible layer of material comprises closed cell foam.

13. The method of claim 10 further comprising:
providing a fiber coating layer surrounding the optical fiber axial core; and
providing a plastic overcoat layer surrounding the optical fiber axial core.

14. The method of claim 9, wherein the at least one compressible layer of material is disposed between the at least one layer of strengthening material and the jacket.

15. The method of claim 9, wherein the at least one compressible layer of material is disposed between the at least one layer of strengthening material and the optical fiber core.

16. The method of claim 9, wherein the at least one compressible layer of material has elastic characteristics so that the material of the compressible layer returns substantially to its original shape upon removal of the force.

17. A layered fiber optic cable configured to be placed in a conduit, the cable comprising:
at least one strand of optical fiber forming an axial core of the fiber optic cable;
a fiber coating layer surrounding the at least one strand of optical fiber;
a plastic overcoat layer surrounding the fiber coating layer;
an aramid yarn layer surrounding the plastic overcoat layer;
a compressible layer of material surrounding the aramid yarn layer, wherein the compressible layer of material is configured to compress the at least one strand of optical in response to an application of force due to freezing of water surrounding the fiber optic cable, such that, for a maximum amount of freezing water capable of forming between the conduit and the layered fiber optic cable, the thickness and the compressible characteristics of the compressible layer of material being selected to cause the compressible layer of material to minimize displacement of the at least one strand of optical fiber in response to the application of force; and
a jacket encompassing all layers of the fiber optic cable.

18. The layered fiber optic cable of claim 17 wherein the compressible layer of material comprises neoprene.

19. The layered fiber optic cable of claim 17 wherein the compressible layer of material comprises closed cell foam.

20. The layered fiber optic cable of claim 17, wherein the at least one compressible layer of material has elastic characteristics so that the material returns substantially to its original shape upon removal of the force.

* * * * *